73001 L. P. Harris,
Cane Juice Clarifier.

PATENTED JAN 7 1868

Attest,
Henry Thoman
S. W. Pyle

Inventor,
L. P. Harris

United States Patent Office.

L. P. HARRIS, OF CRESTLINE, OHIO.

Letters Patent No. 73,001, dated January 7, 1868.

---

IMPROVED APPARATUS FOR CLARIFYING SACCHARINE JUICES.

---

*The Schedule referred to in these Letters Patent and making part of the same.*

---

TO ALL WHOM IT MAY CONCERN:

Be it known that I, L. P. HARRIS, of Crestline, in the county of Crawford, in the State of Ohio, have invented a new and useful Improvement in Apparatus for Clarifying Saccharine Juices; and I do hereby declare that the following is a full and exact description thereof, reference being had to the accompanying drawings, and to the letters of reference marked thereon, in which—

The nature of my invention consists in removing from cane-juice the various substances which, together with the juice, are removed from the stalk in the process of crushing and pressing the same, by means of an apparatus so constructed and arranged as to allow these substances to settle to or near the bottom of the vessel containing the juice, while the pure top juice may be drawn from the vessel previous to submitting it to the action of heat.

The necessity of my invention arises in the fact that in our northern climate the sorghum or sugar-cane seldom reaches a high degree of maturity before it is more or less injured by frost. We are, therefore, in order to save our crop, often compelled to gather and work it up in an immatured state. The pressure necessary to remove the juice in this tender and immatured condition of the stalk also removes a portion of the chlorophyl, albumen, starch, and such other substances as compose the body of the stalk. These substances should be thoroughly separated from the juice before submitting it to the action of heat, as extracting their strength by the action of heat while in the juice not only imparts a very unpleasant flavor to the sirup, but prevents its granulation. A portion of these substances has sufficient specific gravity to cause them to settle to the bottom of the vessel containing the juice. Others, having less specific gravity, settle below the top surface of the juice, and, like a fine, floating cloud, remain suspended in the body of juice, leaving the pure juice at the top. A thorough separation of these substances from the juice is what I have long been laboring to accomplish. I have succeeded satisfactorily, only, by placing the juice in a vessel of sufficient capacity for convenience in operation, and allowing it to remain a sufficient length of time for these substances to precipitate, or, at least, to fall below the top surface, so as to admit of drawing off the pure top juice. By this process of separating these substances, even the fine, floating cloud, which is so difficult to remove from the juice before heating it, I am enabled to make a pure, pleasant-flavored sirup, which readily granulates, producing a fair quality of sugar, which results are very difficult to obtain by the ordinary method of clarifying the juice by heating and skimming.

To enable others skilled in the art to make and use my invention, I will proceed to describe the same with reference to the drawings.

Figure 1:
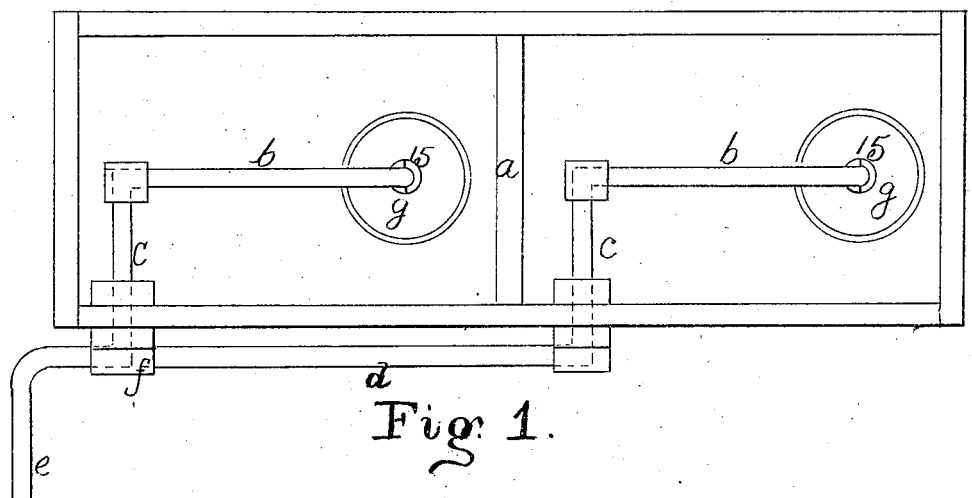
Figure 1 is a plan or top view of my invention.
Figure 2:
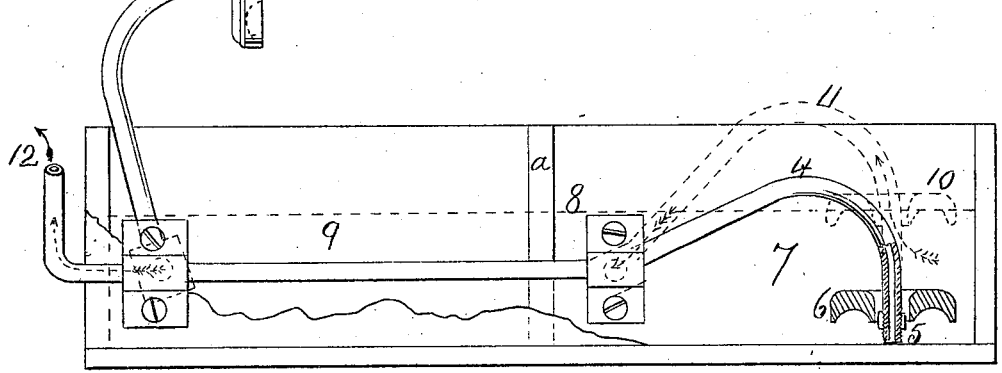
Figure 2 is a longitudinal view of an apparatus embodying my invention.

Fig. 1 is a plan or top view of a clarifying-vessel, which may be made of wood or any suitable material, in which *a* is a partition, dividing the same into two apartments, each of which should be large enough to contain from fifty to one hundred gallons of juice. *b b* are metallic tubes, resembling siphons, more clearly seen at 3 4, fig. 2. *c c* are also metallic tubes, connecting, through the sides of the vessel, the tubes *b b* with the pipe *d*. *e* is an adjustable pipe, entering the block *f* by means of a screw cut on the end of the same, and is connected with the pipe *d*, the tubes *c c* and *b b*. *g g* are adjustable floats, which may be constructed of wood or any suitable material, of proper size, and light enough to float on the surface of the juice and support the points of the siphons, as seen at 10, fig. 2. Through these floats, at or near the centre, is a hole of sufficient size to admit freely the points of the siphons, each of which is provided with a nut, having a projection from opposite sides of sufficient length to extend across the hole in the float, to which these points are so attached as to allow the float to adapt itself to the surface of the juice.

Fig. 2 is a longitudinal view of a clarifying-vessel, which is divided into two apartments, as above described. 5 5 is a thread or screw cut on the end of the tubes 3 4 to receive the nut 15, by means of which the floats 6 6 may be regulated at any desirable distance from the points of the tubes 3 4.

In operating my invention, the juice may flow from the cane-mill so as to fill these apartments alternately; that is, so as to fill one while the juice in the other is being settled and drawn off, as follows: First, fill the apartment 7, fig. 2, as shown by the red line 8. Then turn the flowing juice from the mill into the apartment 9, allowing the juice in the apartment 7 to remain undisturbed until the substances in the juice precipitate, so as to leave a thin stratum of pure juice at the top. The float 10 then being so adjusted, by means of the screw and nut, (see 5 5,) as to allow the point of the siphon 11 to dip slightly into the juice, the operation may commence by corking the end of the siphon 3 at 5. Then pour in juice or water at 12 (which point should rise above 5) until the air is expelled from the tubes. The adjustable pipe 12 then being turned down properly, the juice begins and continues to flow, in the direction of the arrows, on to the evaporator. The siphon 11, being supported by the float 10, is allowed to settle, only, with the top of the body of juice. As the substances contained in the juice precipitate in advance of the point of the siphon 11, we are enabled to draw constantly from the top of the juice, leaving the sediment in the vessel to be removed previous to refilling. The apartment 9 being now filled with juice from the mill, the flowing stream may be turned into the apartment 7. The siphon 11 may now be turned up and corked, as at 5, siphon 3, while siphon 3 may be turned down, and operated as above described.

This clarifier may be so arranged as to operate in combination with any desirable form of evaporators.

What I claim as my invention, and desire to secure by Letters Patent, is—

1. The adjustable float, and its combination with the siphon.

2. The combination of the adjustable float and siphon with the tube c and pipes d and e, substantially as described.

3. A cane-juice clarifier, constructed and operated substantially as described.

4. The combination of a cane-juice clarifier, when constructed and operated substantially as described, with heating and evaporating-pans, for the purposes set forth.

L. P. HARRIS.

Witnesses:
  HENRY THOMAN,
  P. W. POOLE.